N. C. SPRAGUE.
FISH SCALING AND WASHING MACHINE.
APPLICATION FILED SEPT. 30, 1920.

1,383,162.

Patented June 28, 1921.

INVENTOR.
NEWTON C. SPRAGUE.
BY A. B. Bowman.
ATTORNEY

UNITED STATES PATENT OFFICE.

NEWTON C. SPRAGUE, OF SAN DIEGO, CALIFORNIA.

FISH SCALING AND WASHING MACHINE.

1,383,162.  Specification of Letters Patent.  Patented June 28, 1921.

Application filed September 30, 1920. Serial No. 413,661.

*To all whom it may concern:*

Be it known that I, NEWTON C. SPRAGUE, a citizen of the United States, residing at San Diego, in the county of San Diego and State of California, have invented a certain new and useful Fish Scaling and Washing Machine, of which the following is a specification.

My invention relates to a fish scaling and washing machine and the objects of my invention are: first, to provide a machine for removing the scales and washing the outer surface of fish in bulk; second, to provide a machine of this class which will scale and wash a large quantity of fish of varying sizes; third, to provide a machine of this class which is applicable for use for sardines or for larger fish as desired; fourth, to provide a machine of this class with means for turning the fish in the scaling operation; fifth, to provide a machine of this class which is automatic in its action after the fish are fed into a hopper and sixth, to provide a machine of this class which is very simple and economical of construction, durable, efficient in its action and which will not readily deteriorate or get out of order.

Figure 2:
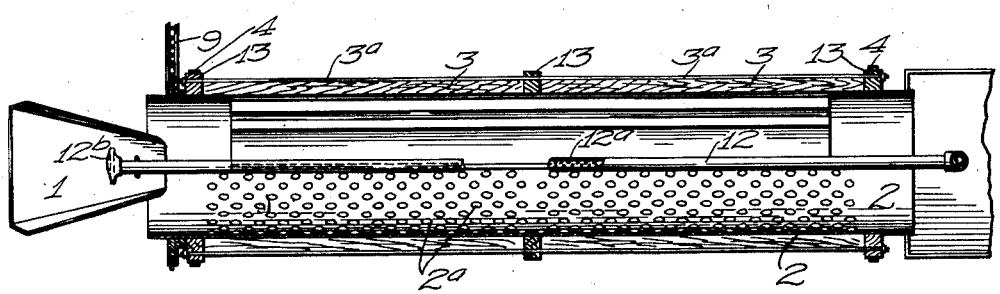
Figure 1:
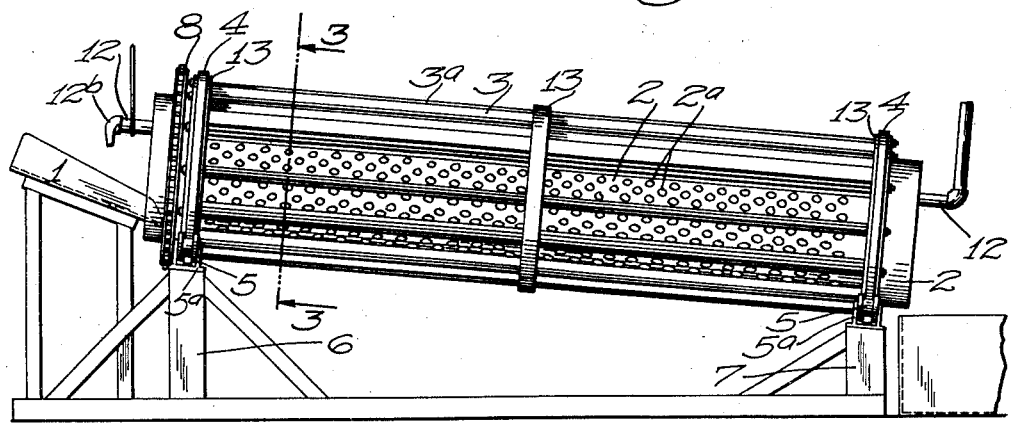
Figure 3:
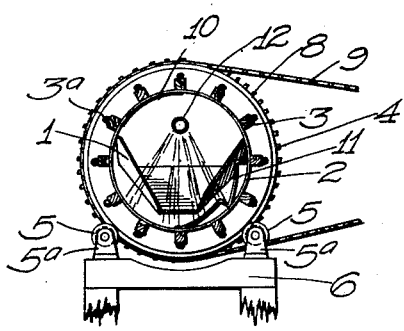
Figure 4:
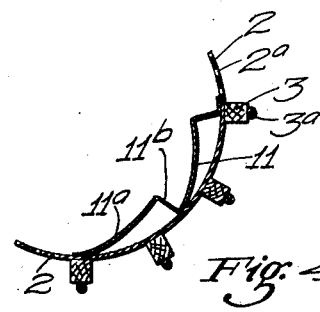

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a side elevational view of my fish cleaning machine; Fig. 2 is a longitudinal sectional view through the middle thereof and showing some of the elevational parts in broken section to facilitate the illustration; Fig. 3 is a transverse sectional view through 3—3 of Fig. 1; Fig. 4 is a fragmentary sectional view on an enlarged scale showing the means for turning the fish during the scaling operation and Fig. 5 is an enlarged sectional view showing one of the perforations in the cylindrical member 2.

Similar characters of reference refer to similar parts and portions throughout the several views of the drawings.

The feed chute 1, metallic cylinder 2, longitudinal supports 3, track members 4, flanged rollers 5, supports 6 and 7, sprocket 8, chain 9, canvas 10, fish turning device 11, pipe 12 and annular supports 13 constitute the principal parts and portions of my fish scaling and washing machine.

Figure 5:
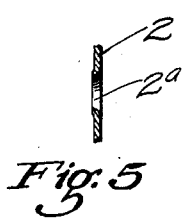

The cylindrical member 2 is a sheet metal member of suitable thickness and it is provided with a plurality of perforations of three-eighths to one-half inch in diameter punched therein from the outside in, so that the edges are turned inwardly slightly as shown best in Fig. 5 of the drawings and these perforations are positioned so that they are closer together at the exit end than at the inlet or feed end so that the scaler is more effective near the outlet end. It is provided in one side with a canvas strip 10 extending longitudinally therein and covering a portion of the inner surface and with a device 11 preferably of sheet metal with short curved and offset portions adapted to turn the fish with the revolution of the cylinder member shaped as shown best in Fig. 4 of the drawings. It is reinforced and supported by means of three annular members 13, one at each end and one in the middle and with a plurality of longitudinal bars 3 between said members 13 and with tie rods 3ª for reinforcing the same over each of the members 3. Secured on the periphery of the two end members 13 is a metallic band 4 which serves as a track and adapted to fit in the grooves between the flanges on the rollers 5 which are positioned at opposite ends of the cylindrical member 2 in bifurcated supports 5ª which are mounted on the supports 6 and 7, it being here noted that the supports 6 are on a higher elevation than the supports 7 so that the machine is on an incline as shown best in Fig. 1 of the drawings. Secured on the one end is a sprocket 8 which is adapted for a chain 9 which engages with a sprocket on any driving mechanism for turning said cylindrical member. Positioned at one end and with one end extending into the end of said cylindrical member is a chute 1 in hopper form into which the fish are poured in mass form and they slide into the upper end of the cylinder and as the cylinder revolves they are carried upwardly some distance along the sides, then slide back, then are carried up again and slide back over the perforations 2ª which removes the scales and some of which are removed by the canvas 10 as the fish slide over said canvas. The fish are turned from one side to the other, sliding on the curved portion 11ª, then dropping over the offset portion 11^b. This, it will be noted, is repeated so that there is a double member of this class. Mounted longitudinally in this cylindrical member is a water pipe 12 which connects with a water pressure system and is provided with a plurality of perforations 12^a on the lower side adapted to sprinkle water on the fish in the cylindrical member 2. It is provided with a nozzle 12^b which is adapted to spray water on the mass of fish when dumped in the chute 1. Thus there is provided a sufficient quantity of water for washing and cleaning the fish while the scales are being removed as they pass from the upper to the lower end of the cylinder out into a vessel from the lower end, the water and scales passing out through the perforations 2^a and onto the floor below.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

It is obvious that with this construction, there is provided a fish scaling and washing machine in the form of a cylindrical perforate member into which the fish are fed into the upper end and moved back and forth over the inner surface with the revolution of the cylindrical member until they reach and pass from the lower end; that there is provided means for washing the fish and for turning them over in the cylindrical member with each revolution of said cylindrical member; that the perforations 2^a being punched so that the edges turn inwardly slightly provide means for engaging the scales of the fish and brush them from the fish without injuring the skin.

Having thus described my invention what I claim as new and desire to secure by Letters Patent is:

1. A fish scaling and washing machine, including a perforate cylindrical member, means for revolving said perforate cylindrical member, a perforate water pipe extending longitudinally in said perforate cylindrical member and a metallic offset member positioned in one side of said cylindrical member adapted to turn the fish with the revolution of said cylindrical member.

2. A fish scaling and washing machine, including an inclined perforate cylindrical member, means for revolving said perforate cylindrical member and a member with an offset portion positioned in one side of said cylindrical member adapted to turn the fish with the revolution of said cylindrical member.

3. A fish scaling and washing machine, including an inclined perforate cylindrical member, means for revolving said perforate cylindrical member, a perforate water pipe extending longitudinally in said perforate cylindrical member, a member with an offset portion positioned in one side of said cylindrical member adapted to turn the fish with the revolution of said cylindrical member and a fabric member positioned longitudinally and covering a portion of the inner surface of said cylindrical member.

4. A fish scaling and washing machine, including an inclined perforate cylindrical member, means for revolving said perforate cylindrical member, a perforate water pipe extending longitudinally in said perforate cylindrical member, a metallic offset member positioned in one side of said cylindrical member adapted to turn the fish with the revolution of said cylindrical member, a fabric member positioned longitudinally and covering a portion of the inner surface of said cylindrical member and means for reinforcing said cylindrical member.

5. A fish scaling and washing machine, including a thin metallic cylindrical member provided with a plurality of perforations therein, annular track members positioned on each end of said cylindrical member, flanged rollers adapted to engage said tracks, the one positioned on a higher elevation than the other whereby said inclined member is positioned on an incline, means for feeding fish into the upper end of said member, means for sprinkling water on the interior of said cylindrical member and means for turning the fish with each revolution of said cylindrical member.

In testimony whereof I have hereunto set my hand at San Diego, California, this 21st day of September, 1920.

NEWTON C. SPRAGUE.